United States Patent [19]

Witzel

[11] 3,974,293

[45] Aug. 10, 1976

[54] NON-ADHESIVE CHEWING GUM COMPOSITION

[75] Inventor: Frank Witzel, Spring Valley, N.Y.

[73] Assignee: Life Savers, Inc., New York, N.Y.

[22] Filed: Nov. 26, 1975

[21] Appl. No.: 635,453

[52] U.S. Cl. .................................................. 426/4
[51] Int. Cl.$^2$............................................ A23G 3/30
[58] Field of Search ...................................... 426/4–6

[56] References Cited
UNITED STATES PATENTS

| | | | |
|---|---|---|---|
| 2,197,719 | 4/1940 | Conner | 426/4 |
| 2,273,425 | 2/1942 | Traylor | 426/4 |
| 2,288,100 | 6/1942 | Manson | 426/4 |
| 3,255,018 | 6/1966 | Comollo | 426/4 |

*Primary Examiner*—Jeanette M. Hunter
*Attorney, Agent, or Firm*—Lawrence S. Levinson; Merle J. Smith; Burton Rodney

[57] ABSTRACT

A new chewing gum is provided, which does not adhere to dentures formed from conventional denture materials, aids in reducing and/or substantially eliminating denture odor, and is formed from a synthetic gum base material which contains titanium dioxide, various detackifying agents, viscosity modifying agents and wetting agents, and a soluble phase which includes one or more sweeteners, wetting agents, flavoring materials, coloring, and optionally chlorophyllin or other breath freshener.

19 Claims, No Drawings

NON-ADHESIVE CHEWING GUM COMPOSITION

The present invention relates to a chewing gum composition which will not adhere to natural or artificial teeth or prosthetic devices and reduces and/or substantially eliminates denture odor.

The interface between natural teeth and chewing gum is not one of tooth enamel (calcium phosphate) but rather mucin which is a slippery proteinaceous film covering natural teeth. However, it appears that artificial teeth and dentures, which are usually formed of acrylic polymers, polystyrene, polyvinyl chloride, polyvinyl esters (Luxene), hard rubber (Vulcanite), and the like, do not wet as effectively as natural teeth, and will not readily be coated with mucin. Accordingly, where many chewing gum compositions will not adhere to natural teeth, they will adhere to artificial teeth and dentures.

Various additives for chewing gums have been suggested to reduce or eliminate the problem of chewing gum adhering to dentures and artificial teeth, such as lecithin as disclosed in U.S. Pat. No. 2,197,719, lanolin as disclosed in U.S. Pat. No. 2,197,718 and silicone oils as disclosed in U.S. Pat. No. 2,761,782. U.S. Pat. No. 3,255,018 to Comollo discloses the use of water-soluble hydrolyzable tannin, such as tannic acid or polymer-tannic acid adducts, in combination with type A or B gelatin water-containing hydrophilic polymer gels.

In accordance with the present invention, a chewing gum composition is provided which will not adhere to artificial teeth, dentures or filling material and will reduce or substantially eliminate denture odor. The chewing gum composition of the invention includes from about 25 to about 35% and preferably from about 28 to about 32% by weight of a gum base composition which is formed of one or more elastomers, such as styrene-butadiene copolymer; hard waxes (that is, waxes having a melting point of above about 65°C) which function as slip agents or lubricants for the gum composition, such as candelilla wax and paraffin waxes or mixtures thereof; one or more solvents for the elastomers which have minimal tackifying properties, such as hydrogenated ester gum; one or more hydrophilic-type detackifiers which absorb saliva and become slippery and are incompatible with the elastomer and solvent for the elastomer, such as polyvinyl acetate; one or more texturizing agents such as calcium carbonate; one or more softening agents-lubricants, such as hydrogenated vegetable or animal fats having a melting point above about 22°C; one or more emulsifiers which function as slip agents and impart hydrophilic properties to the gum base making the gum base slippery on contact with saliva; and titanium dioxide which functions as a combination detackifier, lubricant and slip agent and when employed in the amounts specified hereinafter in combination with the other detackifying agents, slip agents, and lubricants, imparts and enhances the necessary slip relese qualities to the gum base so that it will not adhere to denture material, artificial teeth or filling materials.

The chewing gum composition of the invention also includes from about 75 to about 65%, and preferably from about 72 to about 68% by weight of a soluble phase which includes one or more sweeteners, flavoring materials, coloring agents, wetting agents and optionally chlorophyllin or other breath fresheners.

The elastomers which are employed in the gum base include but are not limited to masticatory substances of synthetic origin such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 8 to about 15%, preferably from about 9 to about 12%, and optimally from about 10 to about 11% by weight of gum base composition.

The hard waxes suitable for use in the gum base composition serve as slip agents or lubricants and should have a melting point of above about 65°C and preferably above about 70°C. Examples of such hard waxes include candelilla wax, paraffin wax, carnauba wax, ozokerite, oricury, microcrystalline wax and the like. The hard waxes will be employed in an amount within the range of from about 12 to about 25% by weight of the gum base, preferably from about 15 to about 23%, and optimally from about 17 to about 22% by weight. The preferred hard waxes are candelilla wax and paraffin wax employed in combination so that from about 3 to about 8% (based on the weight of the gum base) of the candelilla is employed with from about 12 to about 16% (based on the weight of the gum base) of the paraffin wax. The waxes are found to reduce the tackiness of the final gum composition without significantly reducing cohesivity thereof.

The solvent for the elastomer should have minimal tackifying properties and will preferably comprise hydrogenated ester gum, that is, glycerol ester of hydrogenated rosin. However, other solvents may be employed such as dimerized ester gum, pentaerythritol ester gum, polymerized ester gum and ester gum. The solvent will be employed in an amount ranging from about 15 to about 35%, preferably from about 18 to about 30%, and optimally from about 20 to about 25% by weight of the gum base.

The hydrophilic-type detackifier will sorb saliva and become slippery and is incompatible with the elastomer and solvent for the elastomer. Examples of such materials suitable for use herein will include vinyl polymers having a molecular weight of at least 2000, and preferably within the range of from about 2000 to about 10,000 or more, such as polyvinyl acetate, polyvinyl butyl ether and copolymers of vinyl esters and vinyl ethers. The hydrophilic-type detackifier will be employed in an amount ranging from about 15% to about 30%, preferably from about 22 to about 26%, and optimally from about 22 to about 24% by weight of the gum base.

The texturizing agent is employed to adjust the texture of the gum to impart good lubricant and flavor release properties and will be employed in amounts ranging from about 8 to about 50% by weight of the gum base composition, preferably from about 10 to about 20% by weight, and optimally from about 11 to about 15% by weight. Examples of such texturizing agents suitable for use herein include ground limestone (calcium carbonate), talc, hydrated aluminum oxide, and magnesium trisilicate.

The softening agent and lubricant combination which may be employed herein comprises one or more hydrogenated vegetable or animal fats having a high melting point that is above about 22°C and preferably above about 50°C, and will be employed in amounts ranging from about 5 to about 15% by weight of the gum base, preferably from about 5 to about 12%, and optimally from about 6 to about 10%.

The emulsifier will impart hydrophilic properties to the gum base so that saliva will be absorbed thereby making the gum base slippery and will be employed in amounts ranging from about 0.1 to about 10% by weight of the gum base, preferably from about 4 to about 7%, and optimally from about 5 to about 7%. Examples of such emulsifiers include glyceryl monostearate, phosphatides, such as lecithin and cephalin, Tweens, Spans, and mixtures thereof.

The titanium dioxide has been found to be an essential component of the chewing gum composition in that it apparently imparts tackifying properties, slip properties, lubricity and cohesivity to the gum base when employed in amounts ranging from about 0.3 to about 1% by weight of the gum base, preferably from about 0.4 to about 0.8%, and optimally from about 0.5 to about 0.7%. Where amounts outside the above ranges of titanium dioxide are employed, the slip properties of the final chewing gum composition will not be satisfactory and, in fact, the chewing gum will adhere to denture materials, filling material and/or aritificial teeth.

In addition, the gum base may include plasticizers, such as lanolin, stearic acid, sodium stearate, potassium stearate and the like, antioxidants, such as butylated hydroxyanisole, butylated hydroxytoluene, and propyl gallate.

The soluble phase and/or the gum base of the chewing gum composition of the invention may include one or more natural and/or artificial sweeteners present in an amount ranging from about 0.05 to about 90% by weight, preferably from about 40 to about 90% by weight, and more preferably from about 55 to about 85% by weight of the final chewing gum product. Such sweeteners may include one or more sugars or sugar-containing material, for example, monosaccharides, disaccharides and polysaccharides, some examples of which follow:

A. Monosaccharides of 5 or 6 carbon atoms — arabinose, xylose, ribose, glucose, mannose, galactose, fructose, or sorbose or mixtures of two or more of the foregoing monosaccharides.

B. Disaccharides — sucrose such as cane or beet sugar, lactose, maltose or cellobiose; and C. Polysaccharides — partially hydrolyzed starch, dextrin or corn syrup solids.

Furthermore, artificial sweeteners may be employed. Examples of such sweeteners include poorly water-soluble as well as water-soluble forms such as the free acid form of saccharin, sweet-tasting polyols, such as sorbitol and mannitol, sodium saccharin, calcium saccharin, dihydrochalcones, glycyrrhizin, glycyrrhizic acid ammonium salt, L-aspartyl-L-phenyl-alanine methyl ester, as well as *Stevia rebaudiana* (Stevioside), *Richardella dulcifica* (Miracle Berry), *Dioscoreophyllum cumminsii* (Serendipity Berry), cyclamates, and the like, or mixtures of any two or more of the above.

The soluble phase and/or the gum base will also include a flavoring in an amount ranging from about 0.3 to about 1.5% by weight and preferably from about 0.8 to about 1.2% by weight of the final chewing gum product. The flavoring may comprise oils derived from plants, leaves, flowers, etc. Representative flavor oils of this type include essential oils such as peppermint oil, spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen), and also include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence and the like. Various synthetic fruit flavors such as mixed fruit may also be incorporated in the chewing gum of the invention, with or without conventional peservatives.

In addition, other additives such as wetting agents, for example, lecithin, coloring agents such as acceptable FD&C colors, breath freshening agents such as chlorophyllin may be present in the soluble phase.

The following represents preferred formulations of chewing gum in accordance with the present invention:

| Gum Base | % by Weight of Gum Base |
| --- | --- |
| Styrene-Butadiene Copolymer | 10–11 |
| Candelilla Wax | 3–8 |
| Paraffin Wax | 2–16 |
| Polyvinyl Acetate | 22–26 |
| Hydrogenated Ester Gum | 20–25 |
| Calcium Carbonate | 11–15 |
| Hydrogenated Vegetable Fat | 6–10 |
| Glyceryl Monostearate | 5–7 |
| Titanium Dioxide | 0.5–0.7 |

| Chewing Gum | % by Weight of Chewing Gum |
| --- | --- |
| Gum Base | 28–32 |
| Powdered Sugar | 45–55 |
| Corn Syrup | 15–25 |
| Lecithin | 0.1–0.5 |
| Flavor Oil | 0.5–1.5 |
| Coloring | 0.1–0.3 |

The chewing gum of the present invention may be formed using conventional processing techniques.

The following Examples represent preferred embodiments of the present invention.

EXAMPLE 1

A non-tacky chewing gum of the following formulation is prepared as described below.

| Gum Base | Parts by Weight of the Gum Base |
| --- | --- |
| Styrene Butadiene Copolymer | 11 |
| Candelilla wax | 5 |
| Paraffin wax | 14 |
| Polyvinyl acetate | 23 |
| Calcium carbonate | 13 |
| Titanium Dioxide | 0.7 |
| Ester gum | 20 |
| Vegetable fat | 7 |
| Glyceryl MOnostearate | 6 |

| Chewing Gum | parts by Weight of Chewing Gum Product |
| --- | --- |
| Gum Base (as above) | 30 |
| Powdered sugar | 50 |
| 44° Corn syrup | 18 |
| Lecithin | 0.3 |
| Imitation Cassia oil | 1.0 |
| Coloring | 0.2 |
| Chlorophyllin | 0.3 |

The above gum base ingredients are blended and purified in accordance with procedures known in the art to form the gum base.

30 Parts gum base is softened by working in a warm (250°C) dough-type mixer. Thereafter 18 parts corn syrup and 0.3 part lecithin are added to the gum base and mixed followed by 50 parts of powdered sugar. 1 Part imitation cassia oil, 0.2 part coloring and 0.3 part chlorophyllin are added toward the end of the sugar mix. After all of the ingredients are thoroughly mixed, the batch is discharged from the mixer, allowed to cool to 130°F, sheeted, scored and cut into sticks.

EXAMPLE 2

A chewing gum in accordance with the present invention having the following formulation is prepared employing the procedure described in Example 1.
Gum Base
As per Example 1.

| Chewing Gum | Parts by Weight of Chewing Gum Product |
|---|---|
| Gum Base (as per Example 1) | 30 |
| Powdered Sugar | 50 |
| 44° Corn Syrup | 19 |
| Lecithin | 0.3 |
| Imitation Cassia oil | 1.0 |
| Coloring | 0.2 |

EXAMPLE 3

In order to show that the chewing gum compositions of the invention may be chewed by persons having artificial teeth, crowns, or dentures without adhering thereto, the following tests were carried out.

A total of 600 subjects were studied including those wearing full dentures and partial dentures and/or having crowns. Subjects were asked to chew either the chlorophyllin gum composition as described in Example 1 or the plain gum composition disclosed in Example 2.

a. In the first test, subjects wearing artificial appliances (dentures) were asked to chew the gum compositions of Examples 1 or 2. The determinations were made on a double blind basis. Neither the investigator nor the subject being evaluated knew which formulation of the gum was being used, that is, whether it was plain or contained chlorophyllin.

The same subjects were used for both formulations of the gum. Each complete trail for each subject was performed on four separate days. The subject chewed, say, plain gum on the 1st and 3rd day, and chlorophyllin gum on the 2nd and 4th day. On rare instances, a subject was not available for both tests on both formulations. In such a case, only the trials in which the gum was chewed twice was tabulated for the records.

After chewing for periods of 3 minutes, 10 minutes and 1 hour, the appliance of the subjects were examined. Only those patient responses were called "satisfactory" in which both trails on any samples of gum failed to adhere. If either trail showed adhesion, the patient was said to have responded "unsatisfactorily".

The results obtained from patients wearing full dentures, partial dentures, or crowns are tabulated in Table I. This Table also shows the results obtained employing different materials of construction used in the manufacture of the appliances.

TABLE I

TYPES OF APPLIANCES STUDIED

| Full Dentures | Plain Gum | | Chlorophyll Gum | |
|---|---|---|---|---|
| | Satisfactory | Unsatisfactory | Satisfactory | Unsatisfactory |
| Acrylic | 91 | 0 | 93 | 0 |
| Luxene | 64 | 0 | 62 | 0 |
| Polystyrene | 58 | 0 | 60 | 0 |
| Polyvinyl chloride | 51 | 0 | 54 | 0 |
| Vulcanite | 31 | 3 | 31 | 0 |
| Totals | 295 | 3 | 300 | 0 |

| Partial Dentures | Plain Gum | | Chlorophyll Gum | |
|---|---|---|---|---|
| | Satisfactory | Unsatisfactory | Satisfactory | Unsatisfactory |
| Acrylic and Gold | 63 | 0 | 63 | 0 |
| Chrome-Cobalt | 38 | 0 | 37 | 0 |
| Platinum | 15 | 0 | 15 | 0 |
| Porcelain teeth | 46 | 0 | 48 | 0 |
| Totals | 162 | 0 | 163 | 0 |

| Crowns | Plain Gum | | Chlorophyll Gum | |
|---|---|---|---|---|
| | Satisfactory | Unsatisfactory | Satisfactory | Unsatisfactory |
| Porcelain | 37 | 0 | 42 | 0 |
| Celluloid | 37 | 0 | 37 | 0 |
| Acrylic | 68 | 0 | 67 | 0 |
| Totals | 142 | 0 | 146 | 0 | b. On days different from the ones above, denture wearing subjects cleaned their dentures with a commercial denture cleanser, rinsed them in water, and inserted them. Each patient then chewed the assigned gum and was evaluated. On an alternate day, the subjct cleaned his denture and then waited exactly 60 minutes to "equilibrate" their dentures. Each subject then chewed the assigned gum. The adherence or non-adherence was checked at the times in the manner indicated above. On other days the subjects repeated the performance, but using the other gum formulation.

The results obtained with patients wearing freshly cleaned dentures and chewing either plain gum or gum containing chlorophyllin 2 minutes ("immediately") and one hour after the cleaning procedure, are shown in Tables IIA and IIB.

TABLE II A.

PLAIN GUM
EFFECT OF DENTURE CLEANSER

| Denture | Before Cleaning | | Immediately after Cleaning | | 1 Hour after Cleaning | |
|---|---|---|---|---|---|---|
| | Satisfactory | Unsatisfactory | Satisfactory | Unsatisfactory | Satisfactory | Unsatisfactory |
| Acrylic | 45 | 0 | 45 | 0 | 45 | 0 |

TABLE II A.-continued

| | | | | | | |
|---|---|---|---|---|---|---|
| Luxene | 40 | 0 | 40 | 0 | 40 | 0 |
| Polystyrene | 40 | 0 | 40 | 0 | 40 | 0 |
| Vulcanite | 32 | 0 | 30 | 2 | 32 | 0 |
| Totals | 157 | 0 | 155 | 2 | 157 | 0 |

TABLE II B.
CHLOROPHYLL GUM
EFFECT OF DENTURE CLEANSER

| Denture | Before Cleaning | | Immediately after Cleaning | | 1 Hour after Cleaning | |
|---|---|---|---|---|---|---|
| | Satisfactory | Unsatisfactory | Satisfactory | Unsatisfactory | Satisfactory | Unsatisfactory |
| Acrylic | 45 | 0 | 45 | 0 | 45 | 0 |
| Luxene | 40 | 0 | 40 | 0 | 40 | 0 |
| Polystyrene | 40 | 0 | 40 | 0 | 40 | 0 |
| Vulcanite | 32 | 0 | 32 | 0 | 32 | 0 |
| Totals | 157 | 0 | 157 | 0 | 157 | 0 | c. On different days from the above two trial days, denture wearing patients rinsed their mouths with an alcoholic mouth wash. Immediately after this rinsing (within 2 minutes) each subject chewed gum and was evaluated for adhesions as in the above trails.

On an alternate day, the subject waited 60 minutes after rinsing his mouth with the mouth wash before chewing gum.

On two other days, the performance was repeated except that the other formulation of gum was chewed.

The results of these trails are shown in Tables III A and III B.

d. On different days, the denture wearing patients rinsed their mouths with non-alcoholic mouthwash. Immediately (within 2 minutes) after this the patient chewed gum and was evaluated for adhesions.

On a separate day, the patients waited 60 minutes after the mouth rinse before chewing the gum, and being evaluated.

On two separate days, the subjects repeated the performance, but chewed the other gum formulation.

The results of these trials are shown in Tables IV A and IV B.

TABLE III A.
PLAIN GUM
EFFECT OF ALCOHOLIC MOUTHWASH

| Denture | Before Rinsing | | Immediately after Rinsing | | 1 Hour after Rinsing | |
|---|---|---|---|---|---|---|
| | Satisfactory | Unsatisfactory | Satisfactory | Unsatisfactory | Satisfactory | Unsatisfactory |
| Acrylic | 40 | 0 | 36 | 4 | 40 | 0 |
| Luxene | 40 | 0 | 38 | 2 | 40 | 0 |
| Polystyrene | 40 | 0 | 37 | 3 | 40 | 0 |
| Vulcanite | 30 | 0 | 24 | 6 | 30 | 0 |
| Totals | 150 | 0 | 135 | 15 | 150 | 0 |

TABLE III B.
CHLOROPHYLL GUM
EFFECT OF ALCOHOLIC MOUTHWASH

| Denture | Before Rinsing | | Immediately after Rinsing | | 1 Hour after Rinsing | |
|---|---|---|---|---|---|---|
| | Satisfactory | Unsatisfactory | Satisfactory | Unsatisfactory | Satisfactory | Unsatisfactory |
| Acrylic | 40 | 0 | 37 | 3 | 40 | 0 |
| Luxene | 40 | 0 | 39 | 1 | 40 | 0 |
| Polystyrene | 40 | 0 | 37 | 3 | 40 | 0 |
| Vulcanite | 30 | 0 | 25 | 5 | 30 | 0 |
| Totals | 150 | 0 | 138 | 12 | 150 | 0 |

TABLE IV A.
PLAIN GUM
EFFECT OF NON-ALCOHOLIC MOUTHWASH

| Denture | Before Rinsing | | Immediately after Rinsing | | 1 Hour after Rinsing | |
|---|---|---|---|---|---|---|
| | Satisfactory | Unsatisfactory | Satisfactory | Unsatisfactory | Satisfactory | Unsatisfactory |
| Acrylic | 40 | 0 | 40 | 0 | 40 | 0 |
| Luxene | 40 | 0 | 40 | 0 | 40 | 0 |
| Polystyrene | 40 | 0 | 40 | 0 | 40 | 0 |
| Vulcanite | 30 | 0 | 30 | 0 | 30 | 0 |
| Totals | 150 | 0 | 150 | 0 | 150 | 0 |

TABLE IV B.
CHLOROPHYLL GUM
EFFECT OF NON-ALCOHOLIC MOUTHWASH

| Denture | Before Rinsing | | Immediately after Rinsing | | 1 Hour after Rinsing | |
|---|---|---|---|---|---|---|
| | Satisfactory | Unsatisfactory | Satisfactory | Unsatisfactory | Satisfactory | Unsatisfactory |
| Acrylic | 40 | 0 | 40 | 0 | 40 | 0 |
| Luxene | 40 | 0 | 40 | 0 | 40 | 0 |
| Polystyrene | 40 | 0 | 40 | 0 | 40 | 0 |
| Vulcanite | 30 | 0 | 30 | 0 | 30 | 0 |
| Totals | 150 | 0 | 150 | 0 | 150 | 0 |

EXAMPLE 4

The Effect of "Denture Gum" on Denture Mouth Odors

PROCEDURE

Each subject reported in the morning after breakfast, but not having cleaned his denture since bedtime the night before, and not after eating.

Nouth odors were collected and evaluated.

The subject chewed the assigned gum for exactly three minutes. The gum was removed from the mouth, but retained by the subject. Mouth odors were again collected and evaluated.

The subject chewed his same piece of gum for an additional 15 minutes, when the cud was discarded.

The subject went about his regular business for four hours, except that no smoking, eating or cleaning of the dentures was permitted. Water could be drunk, but not rinsed around the mouth.

Mouth odors were again collected and evaluated.

On a separate day, this procedure was repeated, but the other gum formulation was used.

These two formulations were used by the subjects again on four other, alternating days, so that each subject chewed each of the two gum formulations three times.

COLLECTION OF MOUTH ODORS

Two glass tubes, an inlet and an outlet, passed through a rubber stopper. The stopper was held between the anterior upper and lower incisor teeth and the lips closed around the glass tubes.

Air from a compressed air line was passed through a charcoal column, then through a water scrubber held at 40°C in a water bath.

This deodorized, moistened, warmed air was passed through the inlet tube into the mouth and out through the outlet into a trapping tube packed in crushed "dry ice". Air was passed through the mouth for exactly 5 minutes.

EVALUATION OF MOUTH ODORS a. Before chewing and 4 hr. samples

The trapping tubes were warmed to 40°C in a water bath. The bottom tube of a Fair-Wells Osmoscope, previously warmed in a dry air oven to 40°C, was inserted into the top of the trapping tube.

The side air inlet of the Osmoscope was covered with a 2-inch glass funnel, the stem of which was connected to the purified-warmed-moistened air as described above.

The pO value of the odor was determined by trained observers using the "sniff" method.

"pO values" represent the exponent of 2 which indicates the dilution of odor so that the olfactory threshold is just reached.

Example: If the threshold for odor is reached when the dilution is 1:32, then $32 = 2^4$ and $pO = 4$.

From past experience with mouth odors evaluated under the conditions described above, a pO of 3 or less is "socially acceptable", whereas pO over 3 is generally objectionable.

The Fair-Wells Osmoscope is calibrated in pO values from 0 to 6. The higher the numerical value, the more intense is the odor being evaluated.

b. After-chewing, samples were evaluated in a manner as described above, except that the air passing into the side air inlet, after being purified, moistened and warmed, passed through a bottle containing a cud of gum, chewed for 3 minutes. From there the air went to the funnel stem. This modification was deemed necessary to correct for odor introduced into the mouth by the flavor of the gum. It was felt to be a justifiable method because the Osmoscope, basically, only determines the difference in air odor entering the side and the bottom. With this modification, it was felt that a truer value of non-gum mouth odor was obtained.

This "gum odor correction" was not used with the 4 hour samples because independent odor detection failed to reveal any residual gum odor.

Table V presents the distribution of the pO values obtained from the different denture types, at the three sample collection times, and with the two gum formulations.

TABLE V

DISTRIBUTION OF pO VALUES

| Acrylic Dentures | | Plain Gum | | Chlorophyll Gum |
|---|---|---|---|---|
| | Before: | 6 – 78 | Before: | 6 – 83 |
| | | 5 – 22 | | 5 – 15 |
| | | 4 – 2 | | 4 – 3 |
| | After: | 5 – 11 | After: | 4 – 27 |
| | | 4 – 41 | | 3 – 56 |
| | | 3 – 39 | | 2 – 18 |
| | | 2 – 11 | | 1 – 1 |
| | 4 Hrs.: | 6 – 17 | 4 Hrs.: | 6 – 1 |
| | | 5 – 64 | | 5 – 41 |
| | | 4 – 21 | | 3 – 9 |
| Luxene Dentures | Before: | 6 – 73 | Before: | 6 – 75 |
| | | 5 – 29 | | 5 – 27 |
| | | 4 – 3 | | 4 – 3 |
| | After: | 6 – 2 | After: | 4 – 16 |
| | | 5 – 4 | | 3 – 50 |
| | | 4 – 40 | | 2 – 34 |
| | | 3 – 48 | | 1 – 5 |
| | | 2 – 11 | | |
| | 4 Hrs.: | 6 – 27 | 4 Hrs.: | 6 – 3 |
| | | 5 – 52 | | 5 – 37 |
| | | 4 – 25 | | 4 – 56 |
| | | 3 – 1 | | 3 – 9 |
| Polystyrene Dentures | Before: | 6 – 72 | Before: | 6 – 78 |
| | | 5 – 28 | | 5 – 27 |
| | | 4 | 4 – 5 | |
| | After: | 5 – 8 | After: | 5 – 2 |
| | | 4 – 36 | | 4 – 21 |
| | | 3 – 54 | | 3 – 50 |
| | | 2 – 7 | | 2 – 30 |
| | | | | 1 – 2 |
| | 4 Hrs.: | 6 – 24 | 4 Hrs.: | 6 – 3 |
| | | 5 – 57 | | 5 – 40 |
| | | 4 – 24 | | 4 – 54 |
| | | | | 3 – 8 |
| Vulcanite Dentures | Before: | 6 – 34 | Before: | 6 – 38 |
| | | 5 – 11 | | 5 – 7 |
| | After: | 5 – 1 | After: | 4 – 12 |
| | | 4 – 27 | | 3 – 23 |
| | | 3 – 17 | | 2 – 8 |
| | | | | 1 – 2 |
| | 4 Hrs.: | 6 – 17 | 4 Hrs.: | 6 – 3 |
| | | 5 – 22 | | 5 – 17 |
| | | 4 – 6 | | 4 – 22 |
| | | | | 3 – 3 |

Table VI shows the Average pO values and the changes in these average pO values for the denture types, at the three collection times, and for the two gum formulations.

Table VII shows the overall averages when the four denture type groups were combined.

TABLE VI

| Dentures | | AVERAGE pO CHANGES | | |
|---|---|---|---|---|
| | | Plain Gum | | Chlorophyll Gum |
| Acrylic | Before | 5.65 | | 5.75 |
| | After | 3.42 | | 2.92 |
| | Change | | −2.23 | −2.83 |
| | 4 Hrs. | 5.00 | | 4.35 |
| | Change | | +1.58 | +1.43 |
| Luxene | Before | 5.65 | | 5.70 |
| | After | 3.40 | | 2.73 |
| | Change | | −2.25 | −2.97 |
| | 4 Hrs. | 5.10 | | 4.32 |
| | Change | | +1.70 | +1.59 |
| Poly Styrene | Before | 5.75 | | 5.78 |
| | After | 3.51 | | 3.07 |
| | Change | | −2.24 | −2.71 |
| | 4 Hrs. | 4.96 | | 4.34 |
| | Change | | +1.45 | +1.27 |
| Vulcanite | Before | 5.75 | | 5.83 |
| | After | 3.66 | | 3.02 |
| | Change | | −2.09 | −2.81 |
| | 4 Hrs. | 5.26 | | 4.46 |
| | Change | | +1.60 | +1.44 |

TABLE VII

| | Average ODOR Changes when chewing gum | |
|---|---|---|
| | Plain Gum | Chlorophyll Gum |
| Before | 5.70 | 5.75 |
| After | 3.48 | 2.92 |
| Change | −2.22 | −2.83 |
| 4 Hr. Wait | 5.05 | 4.36 |
| Change | +1.57 | +1.44 |

CONCLUSIONS Derived from the tests of Examples 3 and 4.

1. Both the Plain Gum and the Chlorophyllin Gum were entirely satisfactory when chewed in a "normal" or usual fashion by wearers of four different types of dentures, Acrylic, Luxene, Polystyrene, and Vulcanite.

2. Both formulations were entirely satisfactory when chewed by subjects wearing partial dentures acrylic, gold or porcelain teeth, and gold, chrome-cobalt alloy or platinum metal supporting structures.

3. Both formulations were entirely satisfactory when chewed by subjects having porcelain, acrylic or celluloid crowns.

4. Both formulations were entirely satisfactory when chewed by wearers of Acrylic, Luxene, and Polystyrene dentures which had been freshly cleaned with a commercial denture cleanser. Two out of 32 Vulcanite dentures showed adhesions when tested within 2 minutes of cleansing. After one hour all tests were satisfactory.

5. When wearers of Acrylic, Luxene, Polystyrene or Vulcanite dentures rinsed their mouths with an alcoholic mouthwash and immediately (within 2 minutes) chewed gum, 135 out of 150 (90%) of the subjects were satisfactory with the Plain Gum, whereas 15 of 150 (10%) were unsatisfactory with Plain Gum.

The corresponding figures for Chlorophyllin Gum were 138 out of 150 (92%), and 12 out of 150 (8%), respectively.

When both formulations were tested one hour after using the alcoholic type mouthwash, they were found entirely satisfactory.

6. Both formulations were entirely satisfactory when chewed by wearers of Acrylic, Luxene, Polystyrene or Vulcanite dentures who had rinsed their mouths with a non-alcoholic mouthwash.

7. Highly objectionable mouth odors in wearers of Acrylic, Luxene, Polystyrene and Vulcanite dentures were materially reduced when the subjects chewed either gum formulation.

8. The Chlorophyllin containing gum formulation reduced the highly objectionable mouth odor of denture wearers more effectively and for each denture type studied, and arrived at, or nearly approached the pO of social acceptability.

9. The average pO of all denture types after chewing the plain gum was 3.48, a drop of 2.22 units.

10. The average pO of all denture types after chewing the chlorophyllin gum was 2.92, a drop of 2.83 units.

What is claimed is:

1. A chewing gum composition which will not adhere to artificial teeth, dentures and plastic filling material while substantially reducing denture odor, comprising a gum base comprising one or more elastomers; one or more hard waxes having a melting point above about 65°C, and which provide lubricity and slip properties to the gum base; one or more solvents for the elastomers, which have minimal tackifying properties; one or more hydrophilic-type detackifiers which absorb saliva and become slippery and are incompatible with the elastomer and solvent for the elastomer; one or more texturizing agents; one or more softening agents having a melting point above about 22°C; one or more emulsifiers which function as slip agents and impart hydrophilic properties to the gum base making same slippery on contact with saliva; and titanium dioxide in an amount within the range of from about 0.3 to about 1% by weight of the gum base, and a soluble phase comprising flavor and sweeteners.

2. The chewing gum composition as defined in claim 1 wherein said titanium dioxide is employed in an amount within the range of from about 0.4 to about 0.8% by weight of the gum base.

3. The chewing gum composition as defined in claim 1 wherein said gum base comprises from about 25 to about 35% by weight of the chewing gum composition.

4. The chewing gum composition as defined in claim 2 wherein said elastomers are employed in an amount within the range of from about 8 to about 15% by weight of the gum base.

5. The chewing gum composition as defined in claim 2 wherein said hard waxes are employed in an amount within the range of from about 12 to about 25% by weight of the gum base.

6. The chewing gum composition as defined in claim 2 wherein said solvent for the elastomers is employed in an amount within the range of from about 15 to about 35% by weight of the gum base.

7. The chewing gum composition as defined in claim 2 wherein the hydrophilic-type detackifier is employed in an amount within the range of from about 15 to about 30% by weight of the gum base.

8. The chewing gum composition as defined in claim 2 wherein the texturizing agent comprises calcium carbonate or talc employed in an amount within the range of from about 8 to about 50% by weight of the gum base.

9. The chewing gum composition as defined in claim 2 wherein the softening agent comprises hydrogenated vegetable or animal fats having a melting point above about 50°C and is employed in an amount within the range of from about 5 to about 15% by weight of the gum base.

10. The chewing gum composition as defined in claim 2 wherein the emulsifier is employed in an amount within the range of from about 0.1 to about 10% by weight of the gum base.

11. The chewing gum composition as defined in claim 4 wherein said elastomer comprises styrene-butadiene copolymer.

12. The chewing gum composition as defined in claim 5 wherein said hard waxes comprise candelilla wax, paraffin wax, or mixtures thereof.

13. The chewing gum composition as defined in claim 6 wherein said solvent comprises hydrogenated ester gum.

14. The chewing gum composition as defined in claim 7 wherein said hydrophilic type detackifier comprises polyvinyl acetate.

15. The chewing gum composition as defined in claim 10 wherein said emulsifier comprises glyceryl monostearate.

16. The chewing gum composition as defined in claim 1 further including an odor freshening agent dispersed in said soluble phase.

17. The chewing gum composition as defined in claim 1 having the following composition:

| Gum Base | Parts by Weight of Gum Base |
| --- | --- |
| styrene-butadiene copolymer | 10–11 |
| candelilla wax | 3–8 |
| paraffin wax | 12–16 |
| polyvinyl acetate | 22–26 |
| ester gum | 20–25 |
| calcium carbonate | 11–15 |
| vegetable fat | 6–10 |
| glyceryl monostearate | 5–7 |
| titanium dioxide | 0.5–0.7 |

| Chewing Gum | Parts by Weight of Chewing Gum |
| --- | --- |
| gum base | 28–32 |
| powdered sugar | 45–55 |
| corn syrup | 15–25 |
| lecithin | 0.1–0.5 |
| flavor oil | 0.5–1.5 |
| coloring | 0.1–0.3 |

18. The chewing gum composition as defined in claim 1 having the following composition:

| Gum Base | Parts by Weight of Gum Base |
| --- | --- |
| styrene butadiene copolymer | 11 |
| candelilla wax | 5 |
| paraffin wax | 14 |
| polyvinyl acetate | 23 |
| calcium carbonate | 13 |
| titanium dioxide | 0.7 |
| ester gum | 20 |
| vegetable fat | 7 |
| glyceryl monostearate | 6 |

| Chewing Gum | Parts by Weight of Chewing Gum Product |
| --- | --- |
| gum base (as above) | 30 |
| powdered sugar | 50 |
| corn syrup | 18 |
| lecithin | 0.3 |
| flavor | 1.0 |
| coloring | 0.2 |
| Chlorophyllin | 0.3 |

19. The chewing gum composition as defined in claim 1 having the following composition:

| Gum Base | Parts by Weight of Gum Base |
| --- | --- |
| styrene butadiene copolymer | 11 |
| candelilla wax | 5 |
| paraffin wax | 14 |
| polyvinyl acetate | 23 |
| calcium carbonate | 13 |
| titanium dioxide | 0.7 |
| ester gum | 20 |
| vegetable fat | 7 |
| glyceryl monostearate | 6 |

| Chewing Gum | Parts by Weight of Chewing Gum Product |
| --- | --- |
| gum base | 30 |
| powdered sugar | 50 |
| corn syrup | 19 |
| lecithin | 0.3 |
| flavor | 1.0 |
| coloring | 0.2 |

* * * * *

UNITED STATES PATENT AND TRADEMARK OFFICE
CERTIFICATE OF CORRECTION

PATENT NO. : 3,974,293
DATED : August 10, 1976
INVENTOR(S) : Frank Witzel

It is certified that error appears in the above-identified patent and that said Letters Patent are hereby corrected as shown below:

Column 4, line 24, should read--Paraffin Wax  12-16--.
Column 9, line 10, "Nouth" should read --Mouth--.
Column 10, TABLE V, under the heading "Plain Gum", the figures
   for "Polystyrene Dentures  Before:" should read
   -- 6 - 72
      5 - 28
      4 -  5 --.

Signed and Sealed this

Second Day of November 1976

[SEAL]

Attest:

RUTH C. MASON
Attesting Officer

C. MARSHALL DANN
Commissioner of Patents and Trademarks